United States Patent [19]

Masters

[11] 4,414,784
[45] Nov. 15, 1983

[54] GREENHOUSE STRUCTURE

[76] Inventor: Richard M. Masters, 1 Burns Rd., Lexington, Mass. 02173

[21] Appl. No.: 230,853

[22] Filed: Feb. 2, 1981

[51] Int. Cl.² .............................................. E04b 1/34
[52] U.S. Cl. ......................................... 52/73; 47/17; 52/204; 52/208; 52/656
[58] Field of Search .................... 52/73, 201, 238–242, 52/243.1, 236.1, 236.3, 207, 208, 656, 204; 47/17; 350/264

[56] References Cited

U.S. PATENT DOCUMENTS

| | | | |
|---|---|---|---|
| 601,577 | 3/1898 | Manning | 350/264 |
| 1,747,928 | 2/1930 | Chesney | 350/264 |
| 1,948,159 | 2/1934 | Bayley et al. | 52/207 |
| 1,975,470 | 10/1934 | McInerney | 52/243.1 |
| 3,107,400 | 10/1963 | Anderson | 52/243.1 |
| 3,133,322 | 5/1964 | Douglas | 52/240 |
| 3,227,206 | 1/1966 | Rocco et al. | 52/201 |
| 3,274,741 | 9/1966 | Neagle | 52/243 |
| 3,276,175 | 10/1966 | Birum | 52/242 |
| 3,378,977 | 4/1968 | Vervloet | 52/656 |

FOREIGN PATENT DOCUMENTS

| | | | |
|---|---|---|---|
| 531814 | 10/1954 | Belgium | 52/243.1 |
| 21114 | 5/1956 | Fed. Rep. of Germany | 52/243.1 |
| 1194213 | 5/1959 | France | 52/236.1 |
| 553710 | 1/1967 | Italy | 52/201 |

*Primary Examiner*—James L. Ridgill, Jr.
*Attorney, Agent, or Firm*—Robert T. Gammons

[57] ABSTRACT

An enclosure for an apartment house balcony wherein the balcony has a floor, roof and at least one open side, a wall member structured to be secured across said open side to close said open side, a window opening in said wall member, a transparent panel in said window opening so positioned as to permit light to enter directly into the balcony through the window opening and a reflector panel so positioned as to reflect light not normally entering the window opening into the area of the balcony shaded by the roof.

3 Claims, 10 Drawing Figures

U.S. Patent  Nov. 15, 1983  Sheet 1 of 2  4,414,784
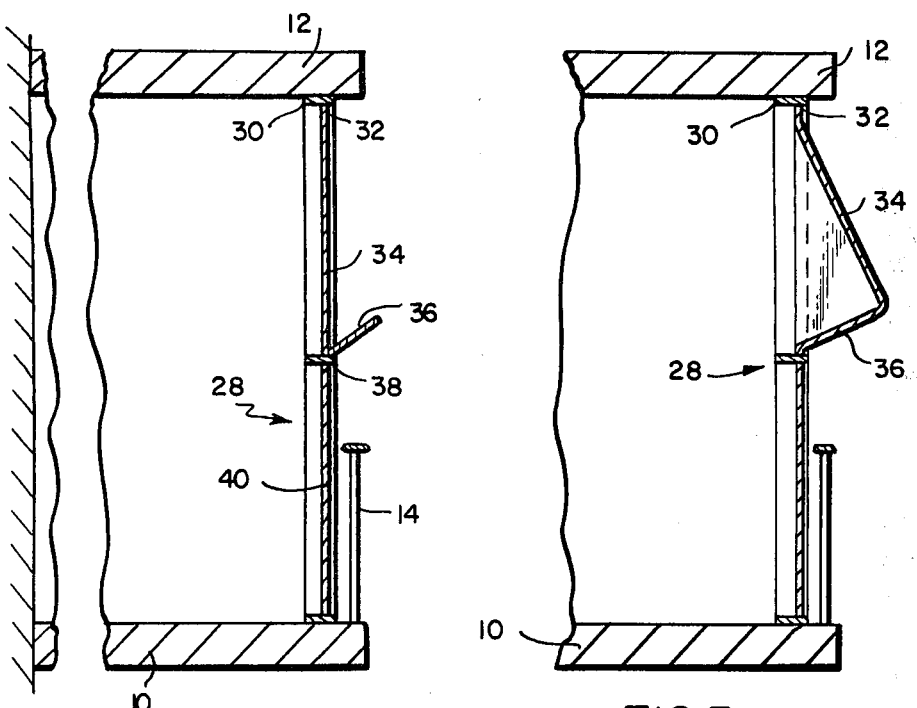
FIG.2
FIG.3
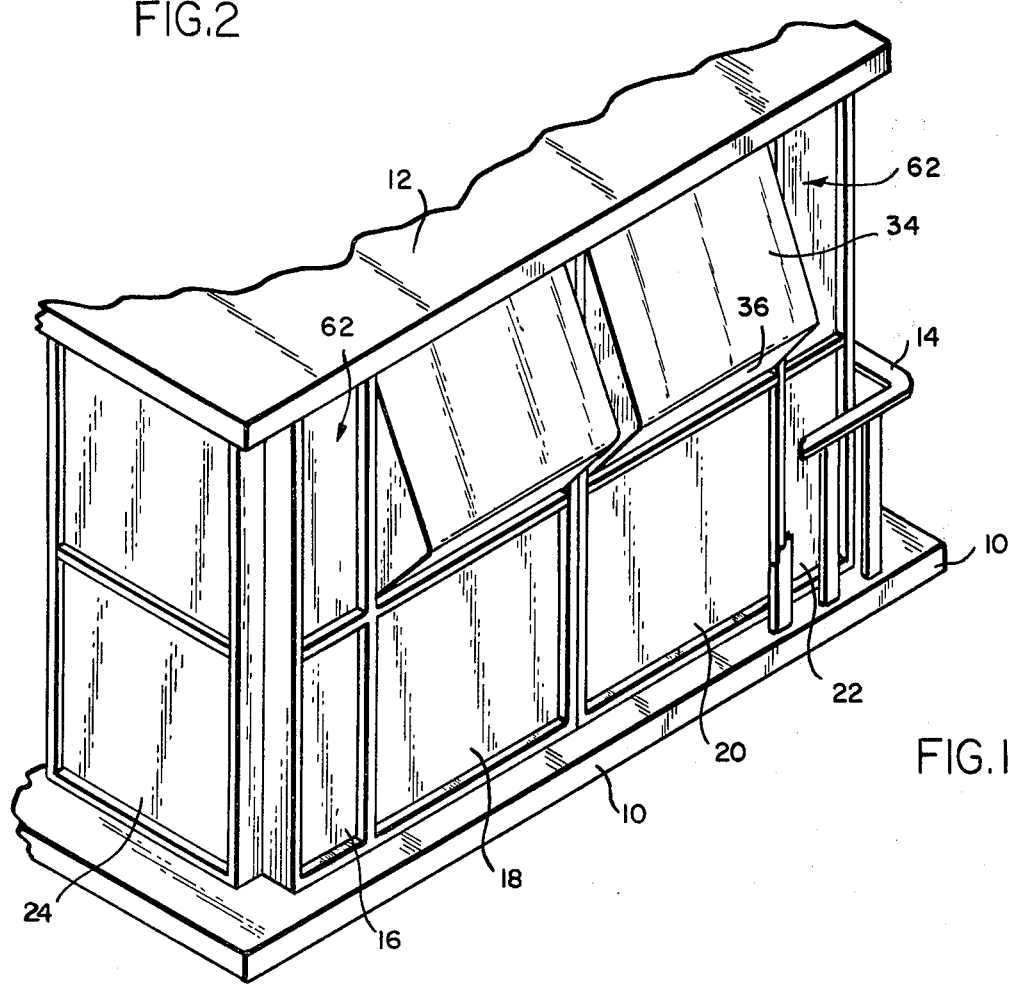
FIG.1

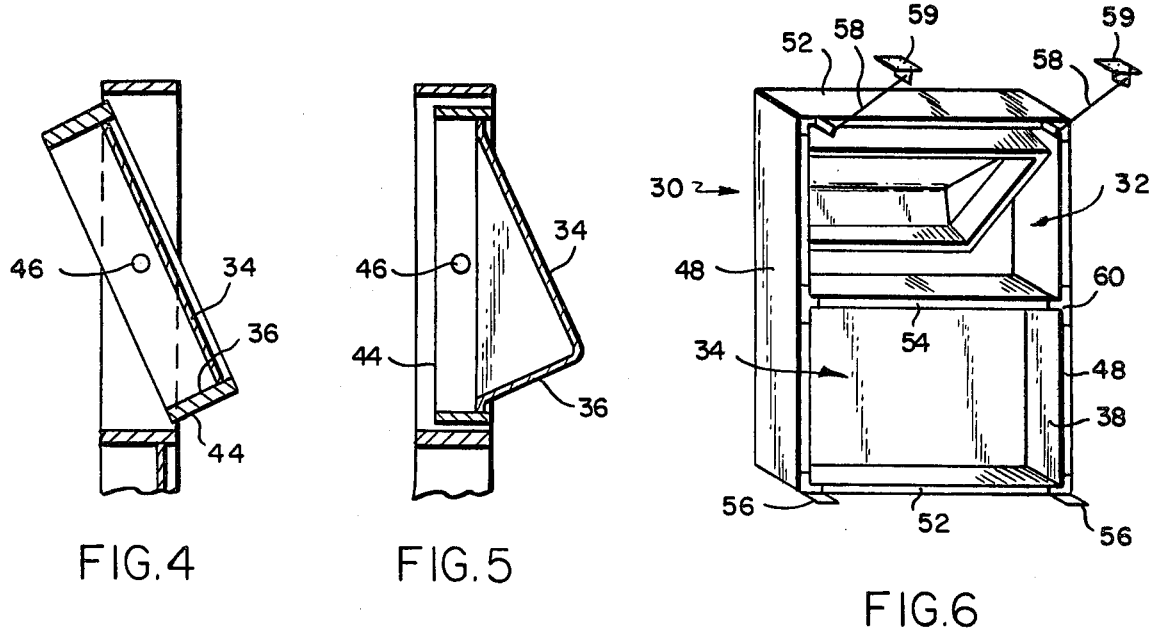
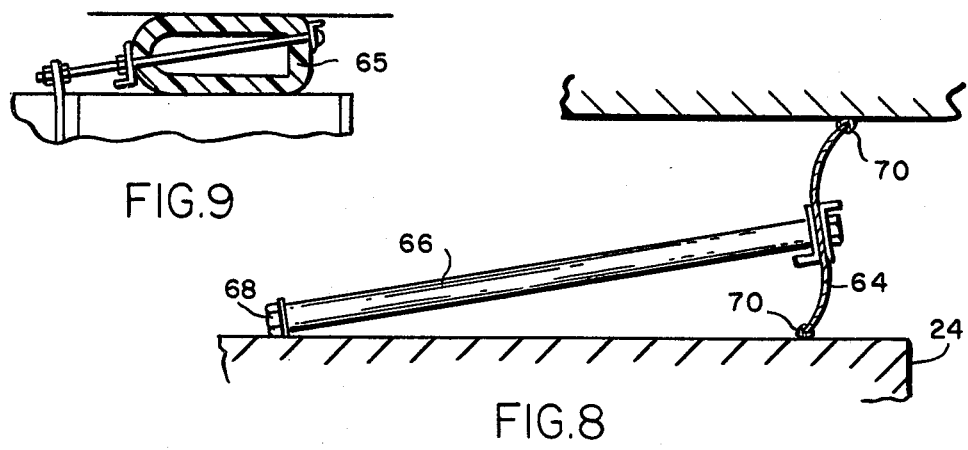
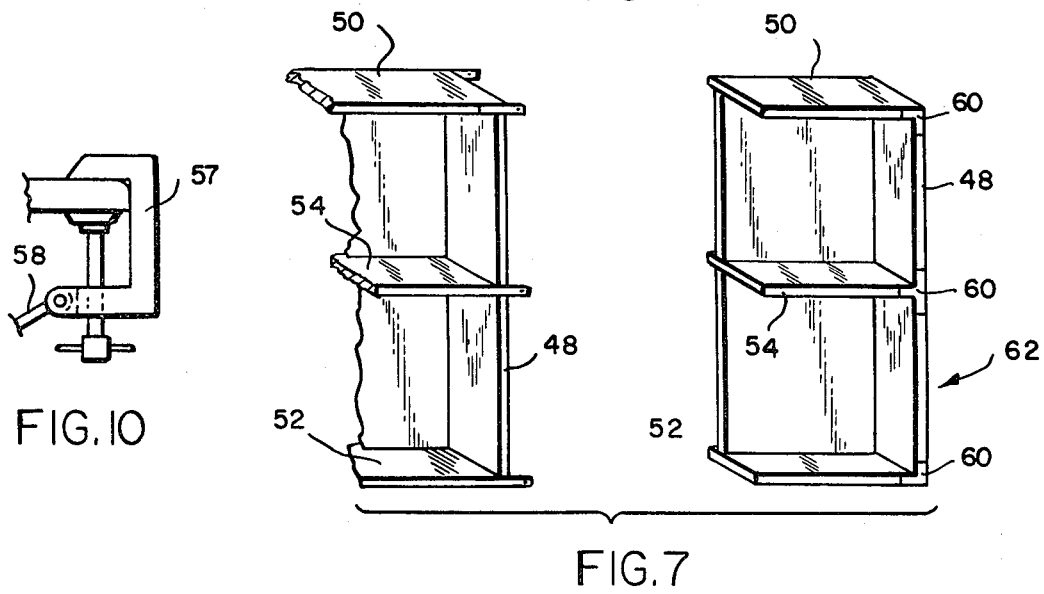

GREENHOUSE STRUCTURE

BACKGROUND OF INVENTION

A greenhouse structure must provide shelter, access to sunlight, and a favorable atmosphere for growth of plants. On ground level, this generally means constructing a suitable structure of sufficient size, with walls and roof of material allowing transmission of sunlight and limiting loss of heat. A major portion of the total sunlight enters through the roof, particularly in the summer when the sun is more nearly overhead. Major design considerations are minimizing construction and environmental conditioning costs.

However, if it is desired to build a structure to provide a greenhouse environment on the porch or patio of a multi-unit high-rise building, certain other considerations become more important. Structural requirements are more severe in high buildings due to high wind loads, public safety, and building codes. Installation generally must be done entirely from the inside. Because porches are relatively small, the structure must provide maximum use of the available space. It may be desirable to revise the installed structure to enclose more or less of a given porch at a later date, or even to move it to another apartment. Light gathering area is limited. Despite these special requirements, it is still desirable to have the enclosure available to the apartment resident at a minimum cost, which implies the use of standardized mass-produced components in a design adaptable to a variety of porch sizes and configurations.

Porches in most high-rise buildings are built one right above the other, meaning that the floor of one is an opaque roof for the one below. Therefore, the only sunlight which can get inside a porch area must pass through the open perimeter. In winter, the sun does not rise as high above the horizon as it does in the summer. That means that in the winter, the sun shines more directly through the side of the porch than it does in the summer when it is more nearly overhead. As a result, it is during the summer, when a greenhouse should be the most active, that the least sun shines inside a porch.

The actual area of a window ($A_o$) transmits a maximum area of solar radiation when it is shining perpendicular to the window surface (angle of incidence $\theta$ equals 0°). As the light moves away from perpendicular to the window surface (angle of incidence $\theta$ increases), the transmitted area of solar radiation decreases, and can be computed from:

$$A = A_o \cos \theta$$

For a vertical south-facing window at latitude 42°, the sun reaches a minimum $\theta_w = 25°$ at midwinter noon, so that $A_w = A_o (0.91)$. In midsummer, for the same window, $\theta_s = 71°$, so that $A_s = A_o (0.33)$. Thus, the window is nearly fully effective in winter, but is effectively only $\frac{1}{3}$ of its size, as far as light gathering is concerned, in midsummer.

Light incident on a transparent surface is partially transmitted, partially reflected, and partially absorbed. While materials of low absorptance are readily available, means for coating the glazing to minimize reflectance, though available, are relatively expensive and effective on a limited range of wavelengths. For uncoated glazing, light shining perpendicular to the transparent surface (angle of incidence $\theta = 0°$), is about 90% transmitted (transmissability $T_o = 0.9$), with little reflected. However, as the light rays are moved more than about 45° away from perpendicular to the transparent surface, increasing the angle of incidence, the amount of light reflected begins to increase. When the angle of incidence $\theta$ reaches 70°, only about 70% of the light is transmitted through the surface ($T_{70} = 0.7$). Thus, as the sun goes higher in the sky, the fraction of light reflected from a vertical window increases, leaving a reduced fraction of the light to be transmitted through the window.

Therefore, a vertical window transmits a decreasing amount of light as the sun rises in the sky for two reasons; reduced window area presented to the solar radiation, and increased reflection of the radiation from the surface. For example, for a window at latitude 42°, the sunlight admitted, ignoring variations in intensity at earth's surface, varies as follows:

$$I = I_o (\cos \theta)(T_\theta)$$

Where:
 $I$ = solar radiation passing through the window
 $I_o$ = solar radiation (insolation) on a plane normal to the rays
 $\theta$ = angle of incidence
 $T_\theta$ = solar transmittance of the glazing material at angle of incidence $\theta$.

At midwinter noon:

$$I_w = I_o (0.91)(0.90) = (0.82) I_o$$

And at midsummer noon:

$$I_s = I_o (0.33)(0.70) = (0.23) I_o$$

Therefore, a vertical south-facing window may transmit only about $\frac{1}{4}$ as much sunlight in summer as in winter, which significantly limits its usefulness as a greenhouse glazing.

Structures on the outside of a high-rise building can be exposed to wind loads significantly greater than those at ground level. Structural members and attachment means must therefore be significantly stronger than for those of ground level structures.

While a greenhouse environment can easily be included in the design of a new building, it could also be desirable to add this feature to a porch on an existing building. Porches in a variety of sizes, shapes, and configurations exist on many buildings. Variations include: presence or absence of a roof, presence or absence of one or both side partitions, and open or solid railing structures. The design of a structure for a particular porch must then take into consideration the exact size and configuration of the actual porch, and assemblies must be made to this size in order to provide the weathertight seal required.

A structure being economically added to the side of a high-rise building must satisfy special installation requirements. It must be transported in elements small enough to fit into elevators or stairways, and be capable of being installed, operated, and maintained entirely from the inside.

The ability to grow outdoor plants in any roofed-over porch is severely constrained, even in summer, by the limited amount of sun admitted. Often, only one row of plants is attempted, located along the outer edge of the porch where the sun enters. Due to the high winds and the desire to extend the growing season, a transparent enclosure is desirable.

When it has been desired to incorporate a greenhouse enclosure inside an existing apartment porch, it has been necessary to have an architect, or suitable designer, design a structure to fit the particular porch, generally using components of some construction system which must be determined to be suitable. Then it would be necessary to locate a contractor familiar with both the construction system and the requirements of a greenhouse, to build and install the enclosure. The standard curtain wall system units are not likely to fit inside a typical porch, so that most parts must be custom precut to fit exactly into the required space, or cut at the site, fitted together, and installed.

Special hardware must be located for assembly, windows and, if necessary, doors, all of which are subjected to high wind loads. Materials which are strong and compatible with a greenhouse environment, yet inexpensive, must be found and fitted together. If it is to be heated, materials of high insulating value must be used. In all, considerable planning and design must be done.

In order to capture more sunlight, entire enclosures have been designed and built which are secured to and extended from the surface of the building, so that there is a transparent roof to gather sunlight.

SUMMARY OF INVENTION

As herein illustrated, the invention comprises an enclosure for an apartment house balcony wherein the balcony has a floor, a roof, and at least one open side; a wall member structured to be secured across said open side to close said open side, a window opening in said wall member and means in the opening so positioned as to reflect light into the area of the balcony shaded by the roof. The wall member includes a window frame embodying a light-transmitting element through which light enters directly into the balcony and means in the opening for reflecting light comprising a panel of reflective sheet material. Desirably, the light-transmitting element through which the light enters directly into the enclosure is parallel to the plane of the window opening and the reflector panel is positioned at an angle thereto. Optionally, the light-transmitting element can be positioned to slope outwardly and downwardly from the top of the window opening and the panel of sheet reflector material can be positioned to slope from the lower edge of the light-transmitting element inwardly and downwardly to the lower edge of the window opening. The light-transmitting element and reflector panel may be mounted in a window frame pivotally supported in the window opening to enable reversing the position of the frame therein for the purpose of cleaning. The wall members may be comprised of one or more panels, one or all of which may have window openings containing light-transmitting elements and reflector panels and, if there are, in addition to an open front side, one or more open ends, there may be wall members secured in the open side and each of the end openings. The wall members, where preferred, can be translucent or opaque and embody heat-insulating material. The wall members are so dimensioned that a combination of one or more panels of standard sizes will span the width of the open side or open ends or a combination of a full width panel and a portion of a full width panel may be tailored to the opening. There are removable means for fastening the panels at their lower ends to the floor of the balcony and at their upper ends to the ceiling of the roof and, if the panels are not as high as the distance between the floor and the roof, adaptable filler panels may be provided to fill the opening. They can in part be cut or adjusted to adapt in part to different sizes, and can be flexible so as to more accurately adapt to exact size and, in bending, take on additional stiffness against wind pressure.

The invention will now be described with reference to the accompanying drawings, wherein:

FIG. 1 is a perspective of a typical enclosure constructed according to this invention on the balcony of an apartment house;

FIG. 2 is a fragmentary perpendicular section through one form of enclosure wherein there is a stationary transparent panel parallel to the window opening and a stationary horizontal panel perpendicular to the window opening;

FIG. 3 is a fragmentary section similar to FIG. 2 wherein there is a downwardly and outwardly-inclined stationary transparent panel and an inwardly and downwardly-inclined reflector panel;

FIG. 4 is a section similar to FIGS. 2 and 3 wherein the window frame is pivotally mounted and there is a transparent panel in the plane of the window frame and the reflector panel is at an angle thereto;

FIG. 5 is a fragmentary section wherein the window frame is pivotally mounted and there is a transparent panel which slopes downwardly and outwardly from the top of the window pane and a reflector panel which slopes inwardly from the lower end of the transparent panel and downwardly to the bottom of the window frame;

FIG. 6 is a perspective view of a single panel with means for fastening at its bottom to the floor of the balcony and means at the top for fastening to the roof of the balcony;

FIG. 7 is a fragmentary portion of a full width panel such as shown in FIG. 1 and an adaptable width panel of smaller width than the full width panel for attaching thereto to fill in a space wider than the full width panel;

FIG. 8 is an elevation of a filler panel for filling the space between the tops of the panels and the roof of an opening where the height of the opening exceeds that of the panels;

FIG. 9 is an elevation of a modified form of filler panel; and

FIG. 10 is a section of one form of clamp for use when screws are prohibited or cannot be used.

Referring to the drawings, FIG. 1, there is shown the floor 10 and roof 12 of an apartment house balcony which is open at the front and open at the ends. Usually a railing 14 extends across the front and along the ends. In most apartment houses, there is a balcony for each floor and so the floor of one balcony constitutes the roof of the subjacent balcony.

According to this invention and as shown in FIG. 1, the entire balcony is enclosed by means of an enclosure comprising, for example, front panels 16, 18, 20 and 22 and end panels 24 and 26, the latter not being shown. As will be illustrated hereinafter, the wall structure comprising the panels is made up so that it can be divided into panels of different width to accommodate the space across the front opening and the spaces across the side openings.

As has been previously related, the enclosure is designed to provide for supplying the maximum amount of light throughout the year to the interior of the balcony for growing flowers and as also previously pointed out, since a balcony is unlike a greenhouse in that no light can enter through the roof and the roof shades a considerable portion of the interior of the enclosure, particularly during the summer months, it is necessary to supplement the light entering the open side by reflecting light which would not normally enter the opening into the shaded area within the balcony. This can be achieved by providing transparent panels through which the light enters directly into the balcony as shown, for example, in FIG. 1 and reflector panels which can reflect light not ordinarily entering the opening into the area of the balcony, also as shown in FIG. 1.

Referring to FIG. 2, there is shown a wall member 28 comprised of a number of panels, one or more of which are provided with a transparent panel and a reflector panel. The wall member 28 is comprised of a substantially rectangular frame 30 having an upper opening 32 containing a transparent panel 34 which is parallel with respect to the open side or open end as the case may be and perpendicular to the plane of the roof and floor and a reflector panel 36 positioned at an angle to the transparent panel 34. The reflector panel is positioned outside the frame 30. The frame 30 has a lower opening 38 containing a panel 40 which may be opaque or translucent and which is desirably of a construction providing a layer of insulation. The wall structure 28 as shown is positioned inside the railing 14 and is secured at its bottom to the floor of the balcony and at its top to the ceiling or the roof.

FIG. 3 shows a modification of that shown in FIG. 2 which provides for more effective entry of light into the balcony during the summer months when the light enters at a much higher angle than during the winter months wherein the transparent panel 34 in the upper opening of the wall member 30 is inclined outwardly and downwardly and the reflector panel 36 is inclined from the lower end of the transparent panel 34 inwardly and downwardly to the lower side of the opening 32. In other respects, the wall structure 28 shown in FIG. 3 is like that shown in FIG. 2.

FIG. 4 shows an alternative form of the structure shown in FIG. 2 wherein the window opening 32 is provided with a window frame 44 which is pivotally mounted in the window opening for rotation about a horizontal axis 46. The window frame contains a flat, transparent vertical panel 34 and a horizontal reflector panel 36. By pivotally supporting the window frame, the transparent panel 34 and reflector panel 36 may be disposed at different angles throughout the day to obtain the best entrance of light or ventilation into the balcony and has the additional advantage that by rotating the frame through 180°, the transparent panel 34 may be easily cleaned.

Similarly, the structure shown in FIG. 3 may be provided with a window frame 44 pivoted for rotation about a horizontal axis 46 within which there is fixed a downwardly and outwardly inclined transparent panel 34 and a downwardly and inwardly inclined panel 36, as shown in FIG. 5.

The enclosure shown in FIG. 1 as previously mentioned may be provided with any one of the structures shown in FIGS. 2, 3, 4 and 5, that shown specifically therein corresponding to the structures shown in FIGS. 3 or 5.

For convenience in installing a structure of the kind described, the panels of which the wall structure is comprised are made up in a size to be easily transported, especially to be brought into an apartment house by way of elevators and each panel as shown in FIG. 6 comprises spaced, parallel side members 48—48, spaced, parallel top and bottom members 52—52 and an intermediate member 54. The members 52—52 and 54 are secured at right angles to the members 48—48, the intermediate member 54 being so positioned as to provide the top opening 32 and the bottom opening 38. FIG. 6 shows the provision of window frame with an inclined transparent panel and an inclined reflector panel of the kind shown in FIG. 5 supported for rotation about a horizontal axis. As also shown in FIG. 6, there are fastening members 56 at the bottom of the panel for securing the panel to the floor of the balcony and members 58—58 provided with anchor plates 59—59 for fastening the top of the panel to the ceiling of the roof. Members 56 and 58 can be screwed or clamped to the porch. Where screws are objected to or cannot be used, removable clamps 57—57 can be used in place of the anchor plates 59—59, as shown in FIG. 10. They provide for ease in replacement.

The members 48, 52 and 54 are secured to each other by means of corner braces 60 and, as shown in FIG. 6, if it becomes desirable due to the fact that the width of the open side of the porch or the open ends of the porch is greater in width than a single panel or two panels, fill-in panels 62 may be easily formed from a full size panel and tailored to fit in as shown at the opposite ends of the enclosure in FIG. 1 at 62.

As previously explained, some balconies have only one open side; however, if there are open ends, end panels may be installed such as shown in 24, FIG. 1, and they may or may not be provided with transparent and reflector panels.

Sometimes it is desirable to use only a part of a balcony for a greenhouse and so a portion of the balcony may be left open by employing only a sufficient number of panels to close a part of the balcony and to leave the remainder unclosed and, if this is the case, the end panel which divides the closed portion from the unclosed portion is desirably provided with a door.

The wall structure as described is comprised of panels which are dimensioned so that in combination and with a minimum of tailoring, they may be fitted to the opening of most conventionally dimensioned balconies. Occasionally, the height of the balcony from floor to roof differs and in order to make up for an open space above the upper end of the panels, a flexible or adjustable panel is provided such as shown in FIG. 8 comprised of a sheet of flexible material 64 which may be cut to the length of the opening extending the transverse width of the opening above the partition and of a width somewhat larger than the height of the opening. The panel 64 is fastened to one end of a pair of spaced, parallel arms 66, the opposite ends of which are anchored to the ends of the enclosure at 68 so as to hold the flexible panel 64 in the opening between the top of the panels and the roof. The flexibility of the panel 64 enables accommodating it to openings of different height. Desirably, the upper and lower edges are provided with flexible gasket material 70. Alternatively, a flexible member 65 as shown in FIG. 9 may be substituted for the panel 64 shown in FIG. 8, particularly if the gap is small.

As herein illustrated, the wall structure comprising the panels may be made up of wood, metal or plastic or a combination thereof, the transparent panels may be of glass or transparent plastic and the reflector panels may be of wood, glass or plastic coated with a reflective coating such as aluminum paint or metal foil.

It should be understood that the present disclosure is for the purpose of illustration only and includes all modifications or improvements which fall within the scope of the appended claims.

What is claimed is:

1. A prefabricated enclosure module for installation within an opening between the roof and floor of an apartment house balcony to provide an enclosed balcony comprising a rectangular frame having spaced, parallel top and bottom members and spaced, parallel side members, a divider member positioned substantially midway between the top and bottom members and parallel thereto extending continuously tranversely of the frame from one side member to the other, said divider member, in conjunction with the top member and the portions of the side members above it, defining an opening above the divider member and said divider member, in conjunction with the bottom member and the portions of the side members below the divider member, defining an opening below the divider member, a window sash coextensive in length and height with the opening above the divider member defining a window opening, means at opposite sides of the sash pivotally mounting the sash within the opening above the divider member for rotation about a horizontal axis, a closure positioned in the opening in the window sash, comprising spaced, parallel side walls spaced apart a distance corresponding to the width of the opening in the window sash and perpendicular to the plane of the opening of right triangular configuration having long and short sides with the long sides extending downwardly and outwardly from the top of the opening and the short sides extending upwardly and outward from the bottom of the opening, and transverse walls joining the long and short edges of the side walls, said side walls and transverse walls being integral, the transverse wall joining the long sides of the side walls defining an outwardly and upwardly-facing transparent panel and said side walls defining vertical transparent panels and the transverse wall joining the short sides of the side walls defining an inwardly and upwardly-facing reflecting panel, said window sash being pivotal about its horizontal axis to adjust the angle of reflected light entering through the transparent panel and reflected by the reflecting panel into the balcony enclosure, and clamping members releasably securing the top and bottom of the frame to the roof and floor, respectively, said clamping members being structured to fix the frame within the opening by frictional engagement with the surfaces of the roof and floor of the structure of the balcony.

2. An enclosure module according to claim 1 wherein the modules are structured so that two or more can be tailored to an opening of predetermined width to fill the opening.

3. An enclosure module according to claim 1 wherein there is a flexible enclosure member interposed between the top of the module and the underside of the roof to fill the opening above the module in the event that the module is of lesser height than the opening.

* * * * *